United States Patent
Wiens

(10) Patent No.: US 9,327,692 B2
(45) Date of Patent: May 3, 2016

(54) LUBRICATION CONTROL CIRCUIT

(71) Applicant: Deere & Company, Moline, IL (US)

(72) Inventor: Scott R. Wiens, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 356 days.

(21) Appl. No.: 13/887,000

(22) Filed: May 3, 2013

(65) Prior Publication Data

US 2014/0326539 A1 Nov. 6, 2014

(51) Int. Cl.
*B60T 5/00* (2006.01)
*B60T 13/66* (2006.01)
*F16D 65/78* (2006.01)
*F16H 61/00* (2006.01)
*F01L 9/00* (2006.01)

(52) U.S. Cl.
CPC ............ *B60T 5/00* (2013.01); *B60T 13/662* (2013.01); *F01L 9/00* (2013.01); *F16H 61/0021* (2013.01); *F16D 2065/782* (2013.01); *F16D 2065/783* (2013.01)

(58) Field of Classification Search
CPC ............ F16D 25/123; F16D 2065/782; F16D 2065/783; F16H 61/0021; F16H 2061/0037; B60T 5/00; F16N 7/00; F16N 27/00; F01L 9/00; F01L 9/02; F01L 9/026
USPC ............................................. 192/85.61, 85.63
See application file for complete search history.

(56) References Cited

U.S. PATENT DOCUMENTS

| | | | | |
|---|---|---|---|---|
| 3,823,801 A * | 7/1974 | Arnold | ..................... | 192/48.618 |
| 4,289,221 A * | 9/1981 | Chambers et al. | ........... | 192/3.57 |
| 4,540,078 A * | 9/1985 | Wetrich | ..................... | 192/85.61 |
| 4,560,044 A * | 12/1985 | Nagata | ......................... | 192/3.57 |
| 4,640,401 A | 2/1987 | Koltookian | | |
| 5,074,394 A * | 12/1991 | Motohashi | ................. | 192/70.12 |
| 5,518,098 A * | 5/1996 | Zanetel et al. | ........... | 192/113.35 |
| 5,738,417 A * | 4/1998 | Wood et al. | ....................... | 303/7 |
| 6,505,529 B1 * | 1/2003 | Legner et al. | ................ | 74/733.1 |
| 7,311,187 B2 * | 12/2007 | Koenig et al. | ................ | 192/48.8 |
| 7,487,864 B2 * | 2/2009 | Kohlhaas et al. | ............. | 192/3.58 |
| 8,042,672 B2 * | 10/2011 | Grethel et al. | ........... | 192/48.611 |
| 8,443,956 B2 * | 5/2013 | Bauer et al. | ................ | 192/85.61 |
| 8,544,624 B2 * | 10/2013 | Grethel | ........................ | 192/3.58 |
| 2004/0159520 A1 * | 8/2004 | Anwar et al. | ................. | 192/70.12 |
| 2007/0170031 A1 * | 7/2007 | Kohlhaas et al. | ............. | 192/48.8 |
| 2010/0064991 A1 * | 3/2010 | Mizoguchi et al. | ........ | 123/41.12 |
| 2013/0133596 A1 * | 5/2013 | Stucchi et al. | ............. | 123/90.11 |

OTHER PUBLICATIONS

German Search Report issued in counterpart application No. 102014207876.8, dated Nov. 27, 2014 (7 pages).
John Deere, "Hercules DR Axle Hydraulic Schematic" (1 page), (schematic of circuit in production before the invention of the subject matter of this application).

* cited by examiner

Primary Examiner — William E Dondero
Assistant Examiner — Minh Truong

(57) ABSTRACT

In a vehicle having a brake line communicating a brake pressure to a brake, a lubrication control circuit controls flow of lubrication fluid to a brake cooling circuit. The lubrication control circuit includes a lube pressure control proportional valve and a shuttle valve. The lube pressure control valve communicates lube fluid to an inlet of the shuttle valve when lube pressure is above a threshold. When the brake is applied, brake pressure in a pilot line operates on the shuttle valve and the shuttle valve communicates lube fluid to the brake cooling circuit and blocks lube flow to other cooling or lube circuits.

4 Claims, 1 Drawing Sheet

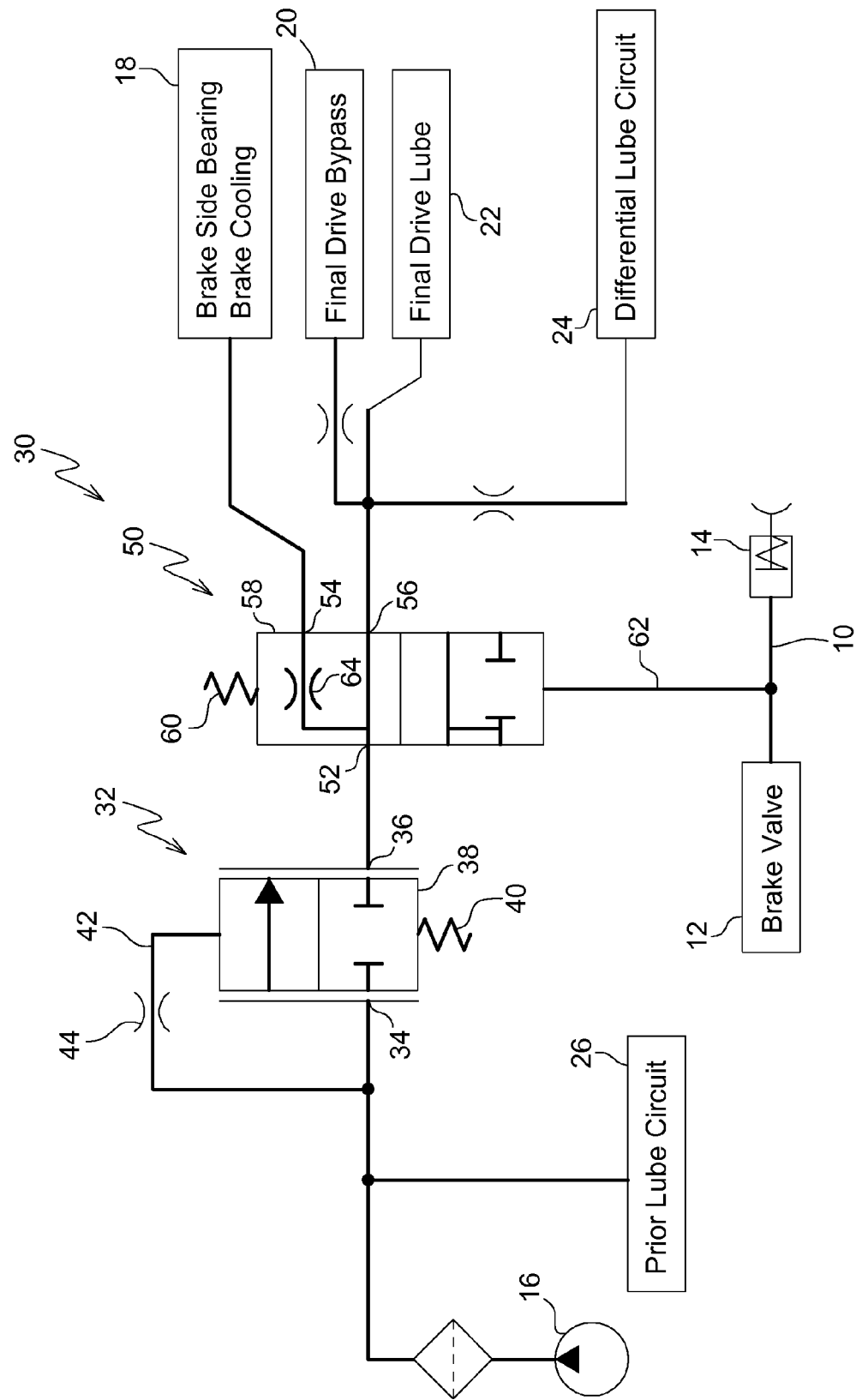

LUBRICATION CONTROL CIRCUIT

FIELD

The present disclosure relates to lubrication control circuit.

BACKGROUND

Currently, some vehicle brake systems include a brake cooling system. In some brake cooling systems, brake cooling is not turned off when the brake is released. This can cause high windage and power loss when the brake is not engaged. In other brake cooling systems, brake cooling is turned off when the brake is released. However, such a known brake cooling system uses an electronic signal produced by a brake pedal position sensor to electronically increase the rear axle lube pressure from 12 to 20 bar and to open the brake cooling valve to full flow. In addition to extra cost of valves, wires and controllers, the level of complexity makes the system difficult to diagnose for problem resolution.

SUMMARY

According to an aspect of the present disclosure, a lubrication control circuit is provided for a vehicle having a brake line communicating a brake pressure to a brake. The lubrication control circuit uses the brake pressure to pilot a spool that controls the amount of cooling flow to the brake. Full cooling flow is allowed only when brake pressure is applied. The lubrication control circuit controls flow of lubrication fluid between a source of lube fluid and at least two components. The lubrication control circuit includes a lube pressure control valve having an inlet connected to the source, and outlet and a pressure control valve member movable to a first position blocking communication between the inlet and the outlet and movable to a second position opening communication between the inlet and the outlet. The lube pressure control valve is preferably a proportional valve. The lube pressure control valve includes a pressure control pilot line which is operable to urge the pressure control valve member to its second position. A control valve biasing member urges the pressure control valve member to its first position. A flow restriction is in the pressure control pilot line.

A shuttle valve has an inlet connected to the outlet of the lube pressure control valve, a first outlet connected to a first component, a second outlet connected to a second component and a shuttle valve member. The shuttle valve member is movable to a first position wherein the first and second outlets are communicated with the inlet of the shuttle valve, and movable to a second position wherein the first outlet is communicated with the inlet of the shuttle valve and the second outlet is blocked. A resilient member is biased to urge the shuttle valve member to its first position. A shuttle valve pilot line is connected to brake line. The shuttle valve pilot line urges the shuttle valve member to its second position.

Instead of using the electronic signals and software, the brake pressure is used to hydro-mechanically shuttle a spool valve. This spool valve shuttles the cooling flow from the final drive circuit to the brake cooling circuit. When the brake pressure is removed, a spring returns the spool to its original location and full lube flow is once again sent to the final drive circuit.

BRIEF DESCRIPTION OF THE DRAWINGS

The sole FIGURE is a schematic circuit diagram of a lube control circuit embodying the invention.

DETAILED DESCRIPTION OF THE DRAWINGS

Referring to the sole FIGURE, a vehicle (not shown) includes a brake line 10 which communicates a brake pressure from a brake valve 12 to a brake 14. The vehicle also includes a lube fluid pressure source or pump 16, and a plurality of vehicle components or circuits, such as a brake side bearing brake cooling circuit 18, a final drive bypass circuit 20, a final drive lube circuit 22, a diff lube circuit 24, and a priority lube circuit 26. The priority lube circuit 26 preferably lubricates and/or cools an SB jet, input quill bearings and an RG side bearing.

A lubrication control circuit 30 controls flow of lubrication fluid between the source 16 and components or circuits 18-26. Control circuit 30 includes a lube pressure control valve 32 which has an inlet 34 connected to the source 16, an outlet 36 and a pressure control valve member or spool 38. Valve member or spool 38 is movable to a first position blocking communication between the inlet 34 and the outlet 36 and movable to a second position opening communication between the inlet 34 and the outlet 36. Valve 32 also includes a resilient member 40 which is biased to urge the valve member 38 to its first position, and a pressure control valve pilot line 42 which is connected to the source 16 and which urges the valve member 38 to its second position. Line 42 includes and orifice 44. Valve 32 is preferably a proportional valve.

Lubrication control circuit 30 also includes a shuttle valve 50. Shuttle valve 50 includes an inlet 52 connected to the outlet 36 of the lube pressure control valve 32, a first outlet 54 connected to a first component or lube circuit 18, and a second outlet 56 connected to at least one additional component or lube circuit, such as lube circuits 20, 22 and 24. Shuttle valve 50 also includes a shuttle valve member 58 which is movable to a first position wherein the first and second outlets 54 and 56 are communicated with the inlet 52, and which is movable to a second position wherein the first outlet 54 is communicated with the inlet 52 and the second outlet 56 is blocked. Shuttle valve 50 also includes a resilient member 60 which is biased to urge the shuttle valve member 58 to its first position, and a pilot line 62 connected to brake line 10. The pilot line 62 operates to urge the shuttle valve member 58 to its second position. Shuttle valve member 58 includes an internal restriction or orifice 64 between inlet 52 and first outlet 54.

The result is a system which uses the brake pressure to pilot a spool that controls the amount of cooling flow to the brake. Full cooling flow is allowed only when brake pressure is applied. No electronic signals or software is required, since the brake pressure is used to hydro-mechanically shuttle a spool valve. This spool valve shuttles the cooling flow from the final drive circuit to the brake cooling circuit. When the brake pressure is removed, a spring returns the spool to its original location and full lube flow is once again sent to the final drive circuit.

If final drive cooling/lube flow is desired or required during a brake event, then the valve member 58 could be modified to include a flow passage with an orifice to provide orificed flow to the final drive lube circuit 22. Various ratios of cooling flow between the final drive 22 and the brake cooling circuit 18 can be implemented. This system could also be used with components other than brakes. For example, this system could be used with a traction clutch wherein clutch pressure would be used to control a shuttle valve which controls flow of clutch cooling fluid.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. In a vehicle having a brake line communicating a brake pressure to a brake, a lubrication control circuit for controlling flow of lubrication fluid to a brake cooling circuit, the lubrication control circuit comprising:
   a lube pressure control proportional valve having an outlet, an inlet connected to a lube fluid pressure source, and a pressure control valve member movable to a a second position opening communication between the inlet and the outlet, a pressure control pilot line operable to urge the pressure control valve member to its second position, and a control valve biasing member which urges the pressure control valve member to its first position, wherein the pressure control pilot line is connected to the lube fluid pressure source; and
   a shuttle valve having an inlet connected to the outlet of the lube pressure control valve, a first outlet connected to the brake cooling circuit, a second outlet connected to a final drive lube circuit, a shuttle valve member movable to a first position wherein the first and second outlets are communicated with the inlet of the shuttle valve, and movable to a second position wherein the first outlet is communicated with the inlet of the shuttle valve and the second outlet is blocked, a resilient member which is biased to urge the shuttle valve member to its first position, and a shuttle valve pilot line connected to the brake line, the shuttle valve pilot line urging the shuttle valve member to its second position to provide flow to the brake cooling circuit and block flow to the final drive lube circuit during a brake event.

2. The lubrication control circuit of claim 1, further comprising:
   a flow restriction in the pressure control pilot line.

3. The lubrication control circuit of claim 1, wherein:
   the shuttle valve member includes an internal flow restriction between the shuttle valve inlet and the shuttle valve first outlet.

4. The lubrication control circuit of claim 1, wherein:
   a priority lube circuit is connected to the pressure source upstream of the inlet of the lube pressure control proportional valve.

* * * * *